(12) United States Patent
Kyuken et al.

(10) Patent No.: US 8,002,277 B2
(45) Date of Patent: Aug. 23, 2011

(54) IMAGE-PROCESSING DEVICE, DOCUMENT-READING DEVICE, ELECTRONIC APPARATUS, AND DOCUMENT-READING METHOD

(75) Inventors: Katsuhiko Kyuken, Osaka (JP); Yoshinobu Umetani, Nara (JP); Yukihiko Sugimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 975 days.

(21) Appl. No.: 10/561,543

(22) PCT Filed: Jun. 18, 2004

(86) PCT No.: PCT/JP2004/008965
§ 371 (c)(1),
(2), (4) Date: Dec. 19, 2005

(87) PCT Pub. No.: WO2005/001759
PCT Pub. Date: Jan. 6, 2005

(65) Prior Publication Data
US 2006/0181745 A1    Aug. 17, 2006

(30) Foreign Application Priority Data
Jun. 27, 2003 (JP) .................................. 2003-185360

(51) Int. Cl.
*B65H 7/12* (2006.01)
(52) U.S. Cl. .............. 271/262; 271/265.01; 271/258.01; 358/498
(58) Field of Classification Search .................. 271/262, 271/263, 265.04, 258.01, 265.01; 399/17, 399/365, 368; 358/496, 498
See application file for complete search history.

(56) References Cited

U.S. PATENT DOCUMENTS

| | | | | |
|---|---|---|---|---|
| 4,620,782 A | * | 11/1986 | Kurando et al. | 399/17 |
| 6,554,275 B1 | * | 4/2003 | Tranquilla | 271/259 |
| 6,731,393 B1 | * | 5/2004 | Currans et al. | 358/1.12 |
| 6,978,992 B2 | * | 12/2005 | Otsuka | 271/10.01 |
| 2003/0090050 A1 | * | 5/2003 | Sueoka | 271/10.01 |

FOREIGN PATENT DOCUMENTS

| | | | |
|---|---|---|---|
| JP | 59-12029 | * | 1/1984 |
| JP | 61-285860 A | | 12/1986 |
| JP | 4-16055 A | | 1/1992 |
| JP | 4-179656 A | | 6/1992 |
| JP | 6-219600 A | | 8/1994 |
| JP | 6-303375 A | | 10/1994 |
| JP | 11-298665 A | | 10/1999 |
| JP | 2000-165594 A | | 6/2000 |

* cited by examiner

*Primary Examiner* — Stefano Karmis
*Assistant Examiner* — Thomas A Morrison
(74) *Attorney, Agent, or Firm* — Birch, Stewart, Kolasch & Birch, LLP

(57) ABSTRACT

An original reading apparatus includes an original transport mechanism that has a pickup roller (R1) and the like and an original reading mechanism that has a light source unit (6) and the like, and captures an image of an original transported by the original transport mechanism. When multi-feeding has occurred, in which when a read original (P1) is transported, another original (P2) is also transported, and the other multi-fed original (P2) is not positioned between the read original (P1) and the light source unit (6) (that is, when a read face (P1a) of the read original (P1) is not obstructed), the reading operation of the read face (P1a) of the read original (P1) is continued by the original reading mechanism.

5 Claims, 13 Drawing Sheets

IMAGE-PROCESSING DEVICE, DOCUMENT-READING DEVICE, ELECTRONIC APPARATUS, AND DOCUMENT-READING METHOD

TECHNICAL FIELD

The present invention relates to an image processing apparatus, an original reading apparatus, an electronic equipment, and an original reading method, provided with a function that detects multi-feeding in which papers of originals or the like are fed in a state with two or more pages stacked.

BACKGROUND ART

A scanner apparatus, copy apparatus, facsimile apparatus, or a multifunction machine in which any of these apparatuses are combined, is equipped with an original reading apparatus for reading an original.

This original reading apparatus is ordinarily provided with a mechanism that detects and prevents multi-feeding in which, when supplying an original page by page from a plurality of pages of originals that have been placed on an original placement stage, due to friction or the like between originals stacked together, two or more pages of originals are supplied stacked together.

As an original reading apparatus provided with a mechanism to detect and prevent this sort of multi-feeding, for example, apparatuses have been proposed in which, even when multi-feeding has occurred when feeding originals, reading continues without suspending transport of the originals, and by sorting with other originals when discharging, the efficiency of original reading has been improved (for example, see JP 2000-165594A).

Also, apparatuses have been disclosed in which, when detecting multi-feeding of the originals during supply of the originals, by transporting the originals in reverse and returning them to the original supply stage, and transporting the originals again, multi-feeding is prevented (for example, see JP H6-219600A).

In the apparatus disclosed in aforementioned JP 2000-165594A, because reading of originals is performed even when multi-feeding has occurred, for example, when an original that has been multi-fed is stacked on a primarily read original, a series of images across two pages of originals are read. Thus, there was the problem that a correct original image could not be read and both of two pages of originals that have been stacked together were poorly read. That is, there was the problem that in repeat reading, because it is necessary to read both of these two pages of originals, the original reading efficiency was not necessarily good. Also, there was the problem that a recording sheet on which an image was formed by the initial reading was wasted.

Also, in the apparatus disclosed in aforementioned JP H6-219600A, a configuration is adopted in which when multi-feeding of the originals is detected during supply of the originals, the originals are transported in reverse and returned to the original supply stage, and transported again, but depending on the state of the multi-feeding, even if reverse transport is performed, the originals that have been multi-fed are not necessarily properly returned to the supply stage; it is possible that the originals may again be multi-fed even when transported again. That is, there was the problem that it was not necessarily possible to reliably eliminate multi-feeding.

DISCLOSURE OF INVENTION

The present invention was made in consideration of the problems described above, and it is an object thereof to provide an image processing apparatus, original reading apparatus, electronic equipment, and original reading method in which, even when multi-feeding has occurred during original transfer, by continuing the reading of originals when an original that has been multi-fed does not block the read face of a read original, an improvement in reading efficiency is achieved and the waste of recording paper when printing a read image is prevented as much as possible. Another object of the present invention is to provide an image processing apparatus, original reading apparatus, electronic equipment, and original reading method in which, even when the multi-fed original covers the read face of the read original, an improvement in reading efficiency is achieved by performing reading of the multi-fed original, and the waste of recording paper when printing the read image, for example, is also avoided as much as possible.

The image processing apparatus of the present invention includes a paper transport mechanism that transports paper and an image processing mechanism that performs image reading processing of the paper transported by the paper transport mechanism, in which when, in the case that multi-feeding has occurred in which when a first paper is transported by the paper transport mechanism another paper is also transported, and the other paper is not positioned between the first paper and a working portion of the image processing mechanism, the working portion of the image processing mechanism is allowed to operate.

Alternatively, the original reading apparatus of the present invention includes an original transport means that transports an original and an image reading means that captures an image of the original transported by the original transport means, in which when, in the case that multi-feeding has occurred in which when a first original is transported by the original transport means another original is also transported, and the other original is not positioned between the first original and a reading portion of the original reading means, the reading operation of the image of the first original by the original reading means is continued.

Here, the original transport means is, for example, an original transport mechanism that, along with having a movable member that can make contact with an original placed on an original placement stage, transports the original by delivering it from the original placement stage by transmitting the movement of the movable member to the original with frictional force between the movable member and the original, which is in contact with the movable member. The original transport means is, for example, an original reading mechanism having a light source that illuminates the original, an optical sensor, and an optical system that guides light reflected from the original illuminated by the light source to the optical sensor, and that captures an image of the original transported by the original transport mechanism. This is the same for the original transport means and original transport means described below.

Also, the case in which the other original is not positioned between the first original and the reading portion of the original reading means refers to a case in which the original transport means is a structure in which a plurality of pages of originals that have been placed on the original placement stage with the original face upward are supplied and transported page by page beginning with the top page, or a structure in which a plurality of pages of originals that have been placed on the original placement stage with the original face downward are supplied and transported page by page beginning with the bottom page.

According to an original reading apparatus having such characteristics, operation of the apparatus is not stopped even when an original, which is paper, has been multi-fed, and so it is possible to improve the original reading efficiency. Also, an operator is not made to perform wasteful work such as removing originals that have piled up in the reading portion or arranging the order of read originals.

Alternatively, the original reading apparatus of the present invention includes an original transport means that transports an original and an image reading means that captures an image of the original transported by the original transport means, in which when, in the case that multi-feeding has occurred in which when a first original is transported by the original transport means another original is also transported, and the other original is positioned between the first original and the reading portion of the original reading means, the reading operation of the image of the first original by the original reading means is stopped.

According to an original reading apparatus having such characteristics, when another original is positioned between the first original and the reading portion of the original reading means, even if the first original is read it is obstructed by the other original, and so the entire image of the original that should be read cannot be read and it will be processed as a reading defect, but because the reading operation is stopped, it is possible to suppress the waste of this sort of work.

Alternatively, the original reading apparatus of the present invention includes an original transport means that transports an original and an image reading means that captures an image of the original transported by the original transport means, in which when, in the case that multi-feeding has occurred in which when a first original is transported by the original transport means another original is also transported, and the other original is positioned between the first original and the reading portion of the original reading means, the reading operation of the image of the other original by the original reading means is continued.

Here, the case in which the other original is positioned between the first original and the reading portion of the original reading means refers to a case in which the original transport means is a structure in which a plurality of pages of originals that have been placed on the original placement stage with the original face upward are supplied and transported page by page beginning with the bottom page, or a structure in which a plurality of pages of originals that have been placed on the original placement stage with the original face downward are supplied and transported page by page beginning with the top page.

According to an original reading apparatus having such characteristics, because the reading operation is stopped when another original is positioned between the first original and the reading portion of the original reading means, it is necessary to recapture both the original that should be read and the other original, but by reading the multi-fed other original when multi-feeding has occurred, only the original that should be read is reread. Thus, it is possible to improve the efficiency of reading as a whole.

A configuration may also be adopted in which, in the original reading apparatus of the present invention, the original reading means detects multi-feeding by detecting the leading edge of the other original when reading the first original.

According to an original reading apparatus having such characteristics, by also using the original reading means for detection of multi-feeding, the number of components is reduced in comparison to separately providing a multi-feeding detection means, and it becomes possible to reduce the cost and size of the apparatus.

A configuration may also be adopted in which, in the original reading apparatus of the present invention, when the original reading means has detected the leading edge of the other original during reading of the first original, the original reading means stops the reading operation of the first original and deletes the read image.

According to an original reading apparatus having such characteristics, when reading another original, because read image data of the first original that should be read is deleted, the image of the other original and the image of the first original do not intermingle, and it is not necessary to perform editing work after original reading.

A configuration may also be adopted in which, in the original reading apparatus of the present invention, a notification means is provided that, when the reading operation of an original could not be performed due to multi-feeding, makes such a notification.

According to an original reading apparatus having such characteristics, by notifying the operator that there is an original for which reading could not be performed due to multi-feeding, it is possible to give an instruction to recapture the original that could not be read, and uneasiness of the user can be alleviated.

A configuration may also be adopted in which, in the original reading apparatus of the present invention, the notification means makes a notification of information of the original for which reading could not be performed due to multi-feeding.

According to an original reading apparatus having such characteristics, by notifying the operator of information (for example, page number or the like) of the original for which reading could not be performed due to multi-feeding, it is possible to clearly give an instruction to the operator to recapture the original that could not be read.

Alternatively, an original reading method of the present invention includes a step of transporting an original with an original transport means, a step of reading an image of the transported original with an original reading means, a step of detecting multi-feeding of another original when transporting a first original with the original transport means, and a step of continuing the reading operation of the image of the first original by the original reading means in the case that the other original is not positioned between the first original and the reading portion of the original reading means, even when the multi-feeding has been detected.

According to an original reading method having such characteristics, the operation of the apparatus is not stopped even when an original, which is paper, has been multi-fed, and so it is possible to improve the original reading efficiency. Also, an operator is not made to perform wasteful work such as removing originals that have piled up in the reading portion or arranging the order of read originals.

Alternatively, an original reading method of the present invention includes a step of transporting an original with an original transport means, a step of reading an image of the transported original with an original reading means, a step of detecting multi-feeding of another original when transporting a first original with the original transport means, and a step of continuing the reading operation of the image of the other original by the original reading means in the case that the multi-feeding has been detected and the other original is positioned between the first original and the reading portion of the original reading means.

According to an original reading method having such characteristics, because the reading operation is stopped when another original is positioned between the first original and the reading portion of the original reading means, it is necessary to recapture both the original that should be read and the other original, but by reading the multi-fed other original when multi-feeding has occurred, only the original that should be read is reread. Thus, it is possible to improve the efficiency of reading as a whole.

BEST MODE FOR CARRYING OUT THE INVENTION

Figure 1:
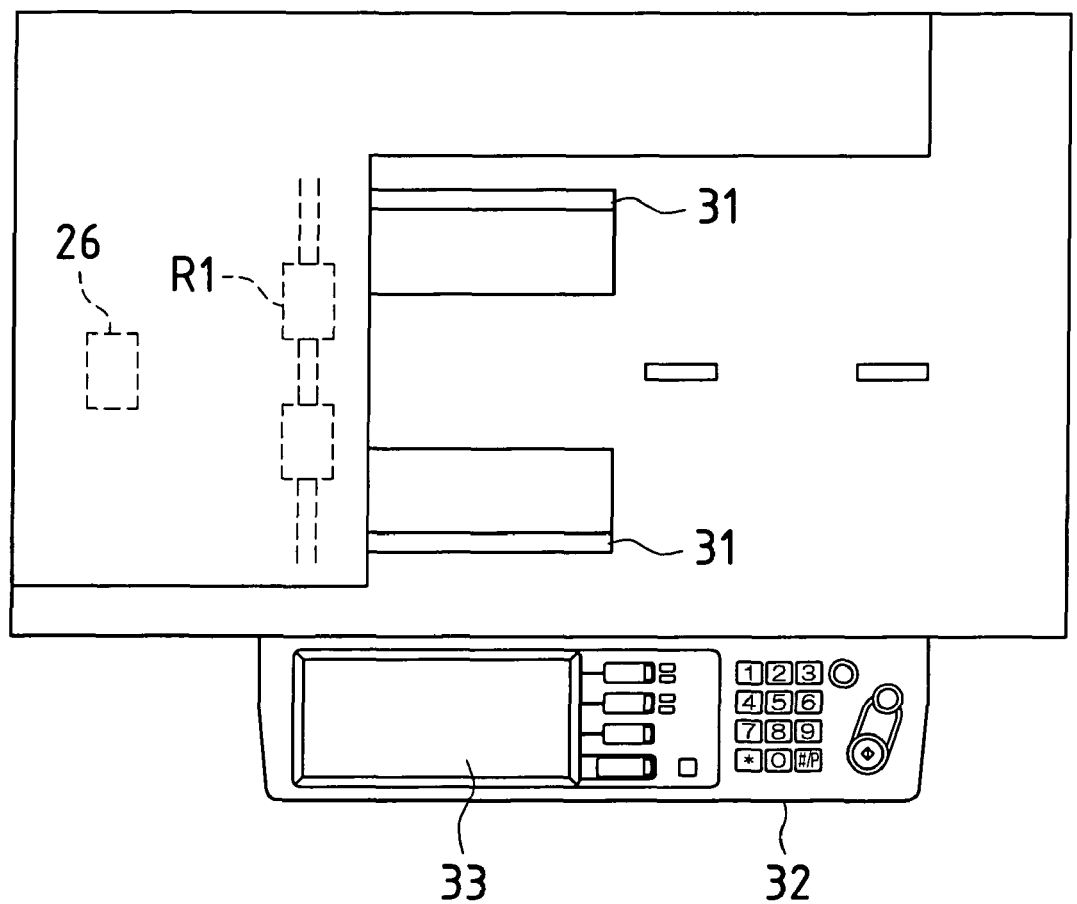
FIG. 1 is a plan view in which an original reading apparatus, which is an image processing apparatus of the present invention, is viewed from above.

Hereinafter, the present invention will be described by way of illustrative embodiments with reference to the drawings. FIG. 1 is a plan view in which an original reading apparatus 1, which is an image processing apparatus of the present invention, is viewed from above.

The original reading apparatus 1 includes a pickup roller R1 that transports originals in order, an original control plate 31 that controls the lateral direction of the originals, and an original insertion sensor 26 that confirms the transport of originals and detects the size of originals in the longitudinal direction. Prescribed recording paper is discriminated by the original control plate 31 and the original insertion sensor 26.

Figure 2:
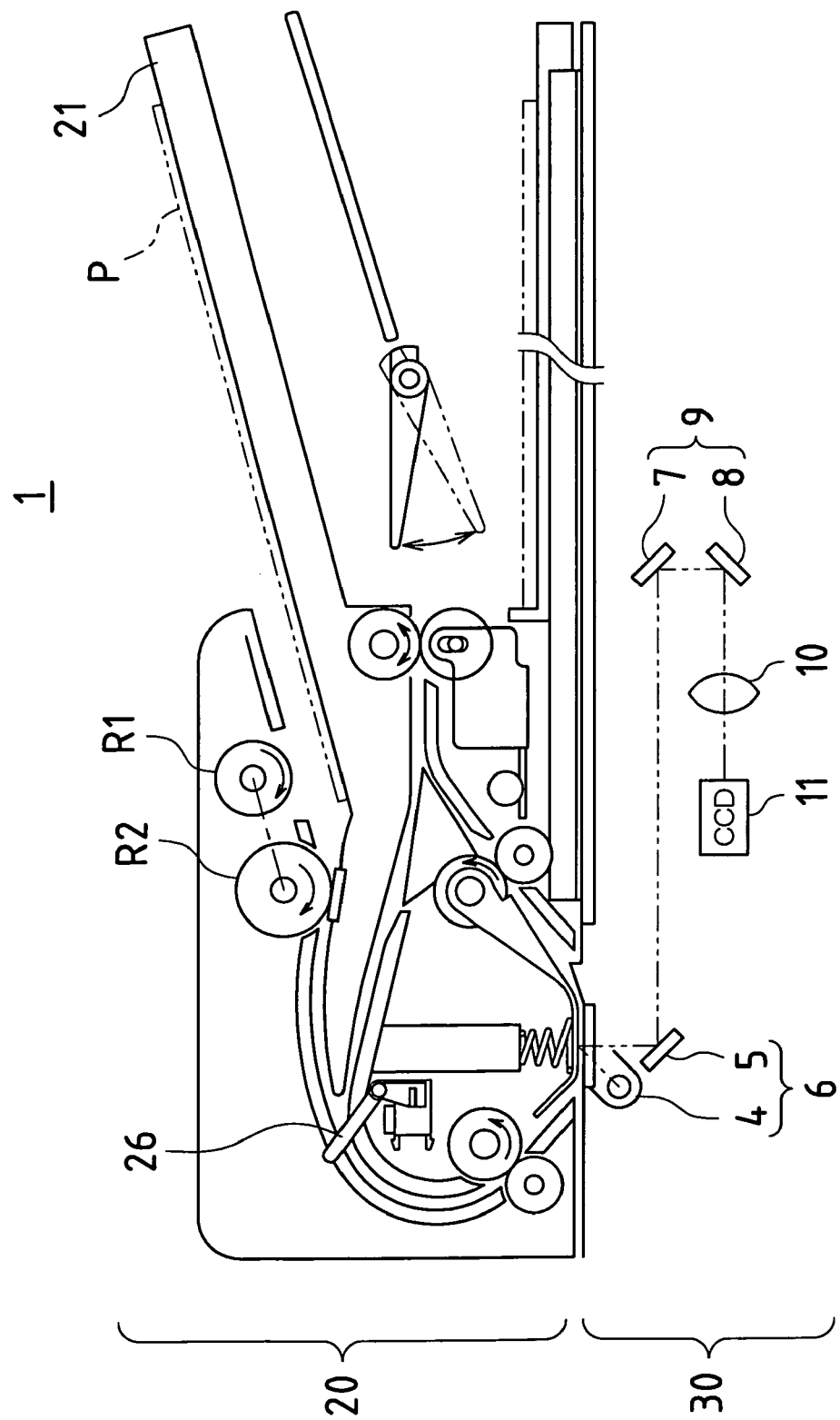
FIG. 2 is a schematic cross-sectional view of an original reading apparatus with a U-shaped type top-intake system.
Figure 3:
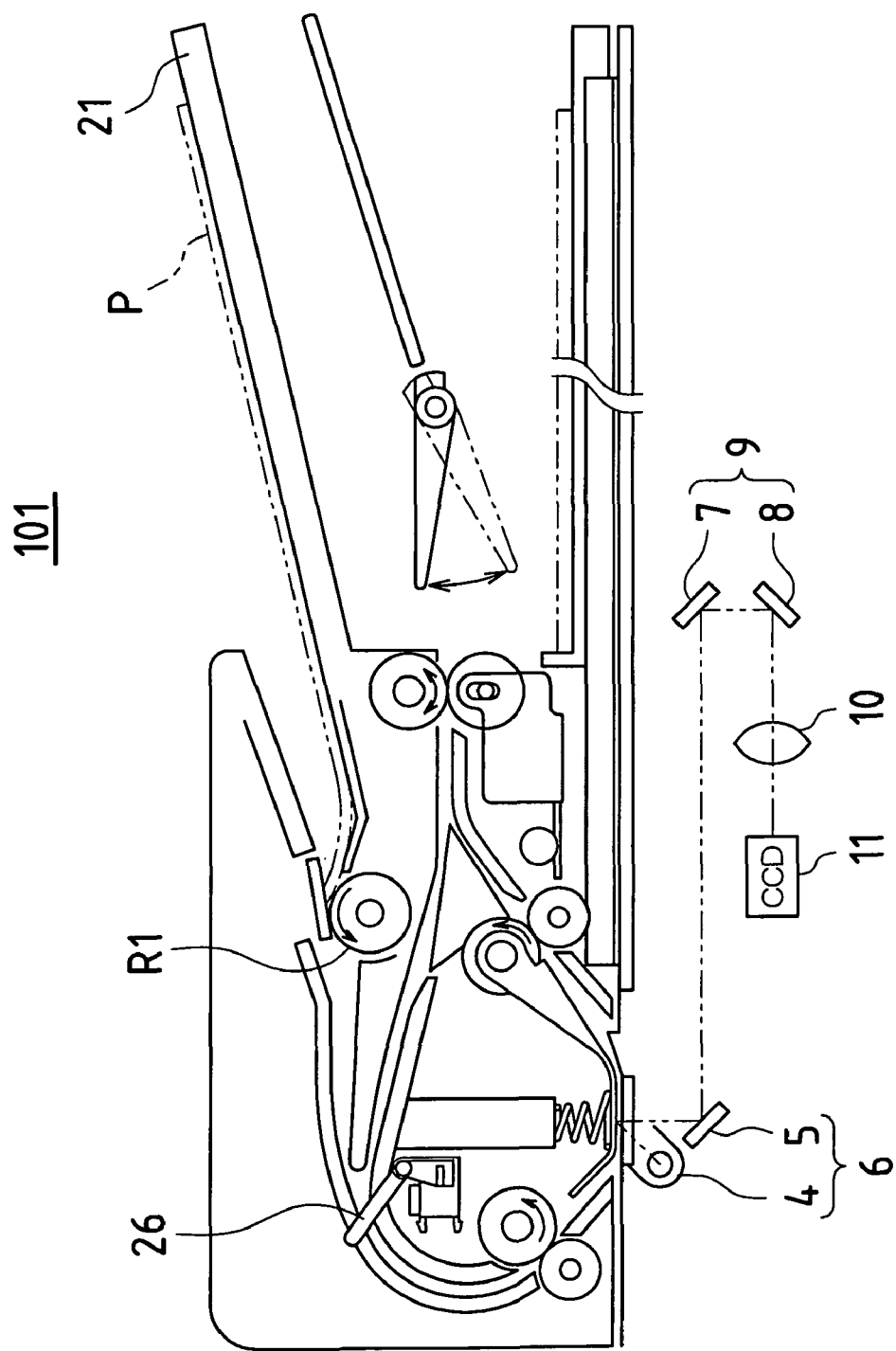
FIG. 3 is a schematic cross-sectional view of an original reading apparatus with a U-shaped type bottom-intake system.
Figure 4:
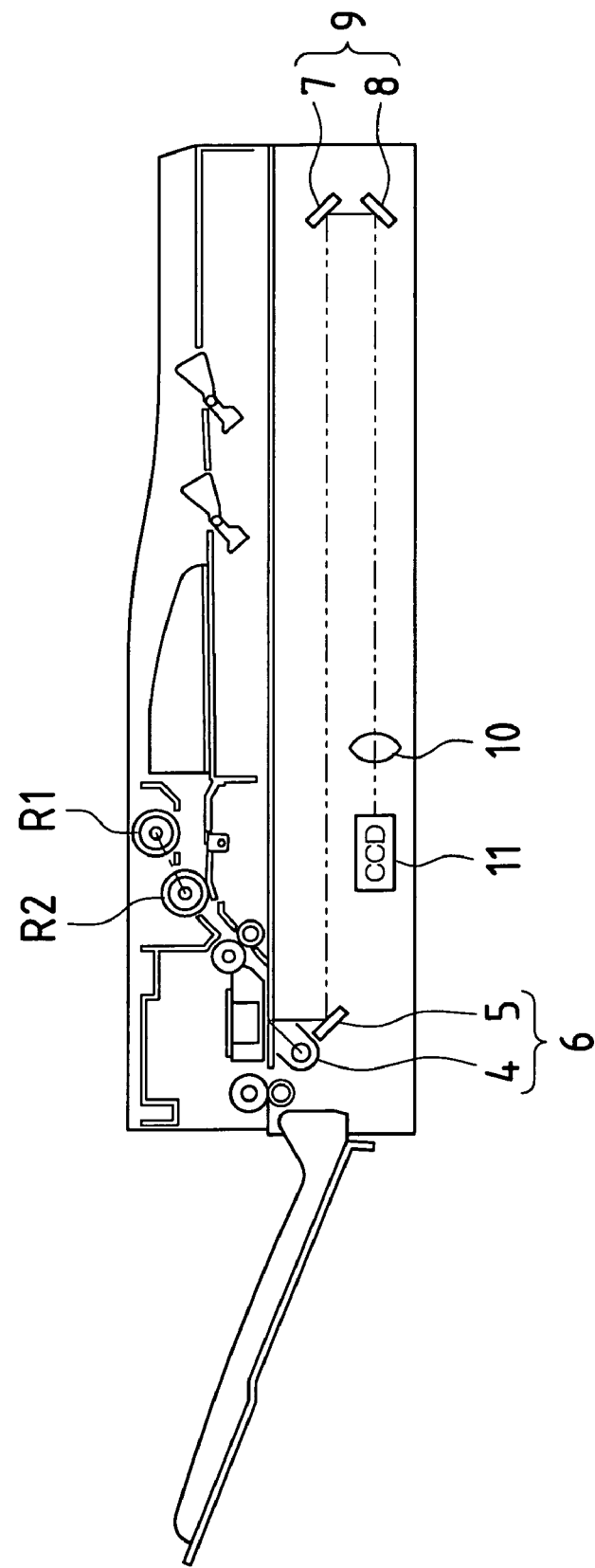
FIG. 4 is a schematic cross-sectional view of an original reading apparatus with a straight type top-intake system
Figure 5:
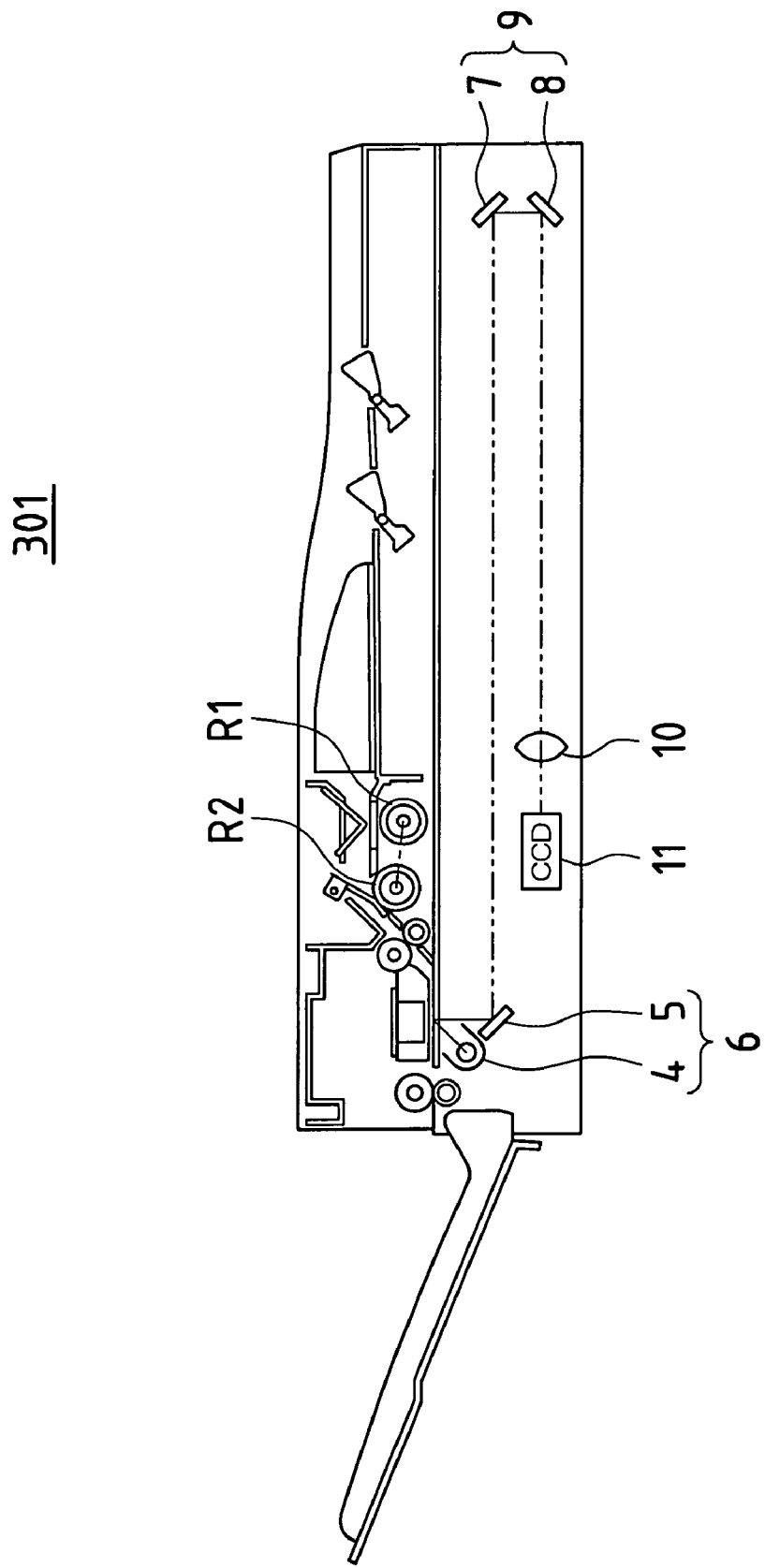
FIG. 5 is a schematic cross-sectional view of an original reading apparatus with a straight type bottom-intake system.

FIGS. 2 through 5 are schematic cross-sectional views of various types of original reading apparatuses, and the original reading apparatus 1 shown in FIG. 2 is an apparatus in which the transport path is a U-shaped type, with a top intake system in which the original face is placed upward and a plurality of pages of originals P that have been placed on the original placement stage are supplied page by page beginning with the top page. An original reading apparatus 101 shown in FIG. 3 is an apparatus in which the transport path is a U-shaped type, with a bottom-intake system in which the original face is placed upward and a plurality of pages of originals P that have been placed on the original placement stage are supplied page by page beginning with the bottom page. An original reading apparatus 201 shown in FIG. 4 is an apparatus in which the transport path is a straight type, with a top-intake system in which the original face is placed downward and a plurality of pages of originals P that have been placed on the original placement stage are supplied page by page beginning with the top page. An original reading apparatus 301 shown in FIG. 5 is an apparatus in which the transport path is a straight type, with a bottom-intake system in which the original face is placed downward and a plurality of pages of originals P that have been placed on the original placement stage are supplied page by page beginning with the bottom page.

Figure 6:
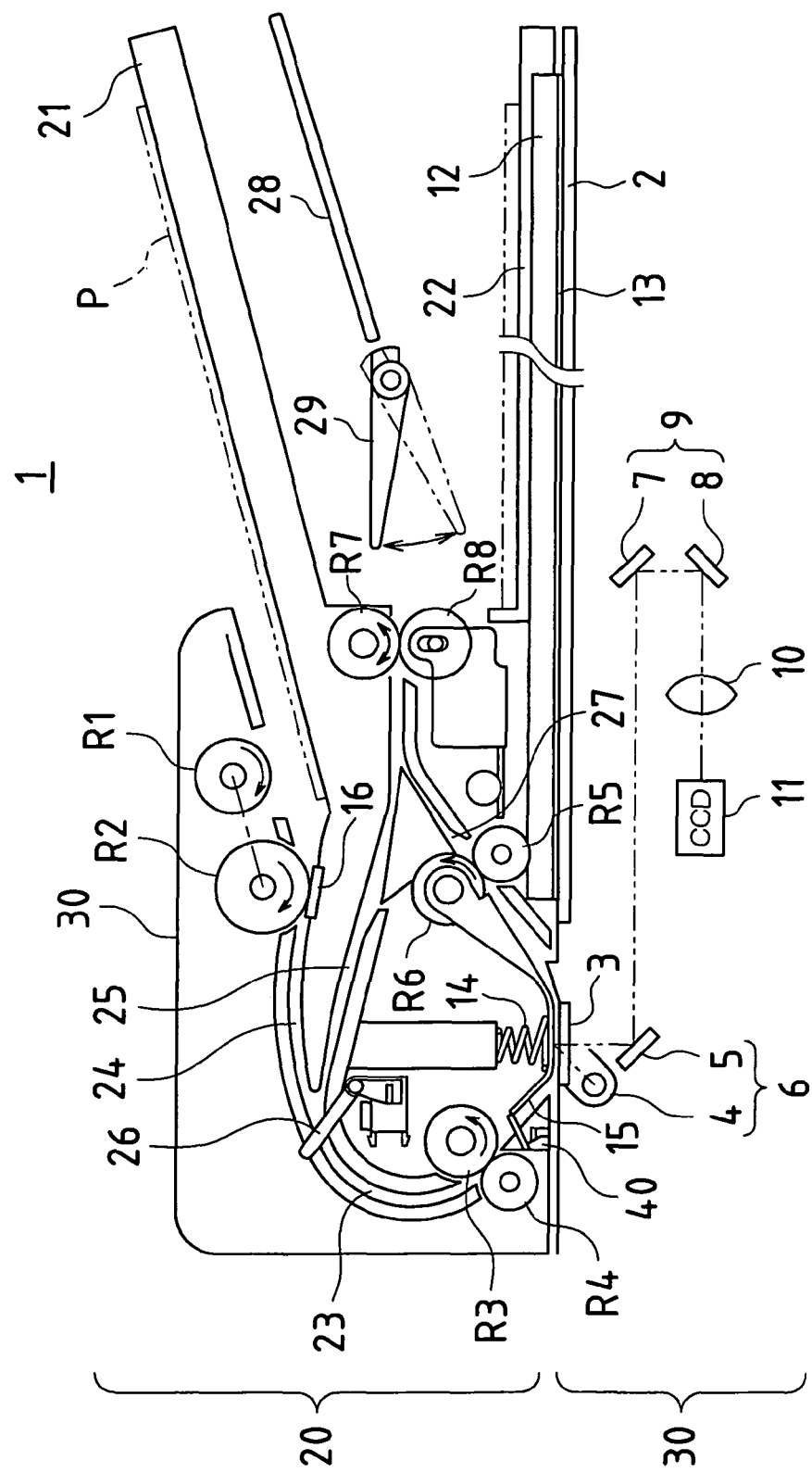
FIG. 6 is a cross-sectional view of an original reading apparatus with a U-shaped type top-intake system.
Figure 7:
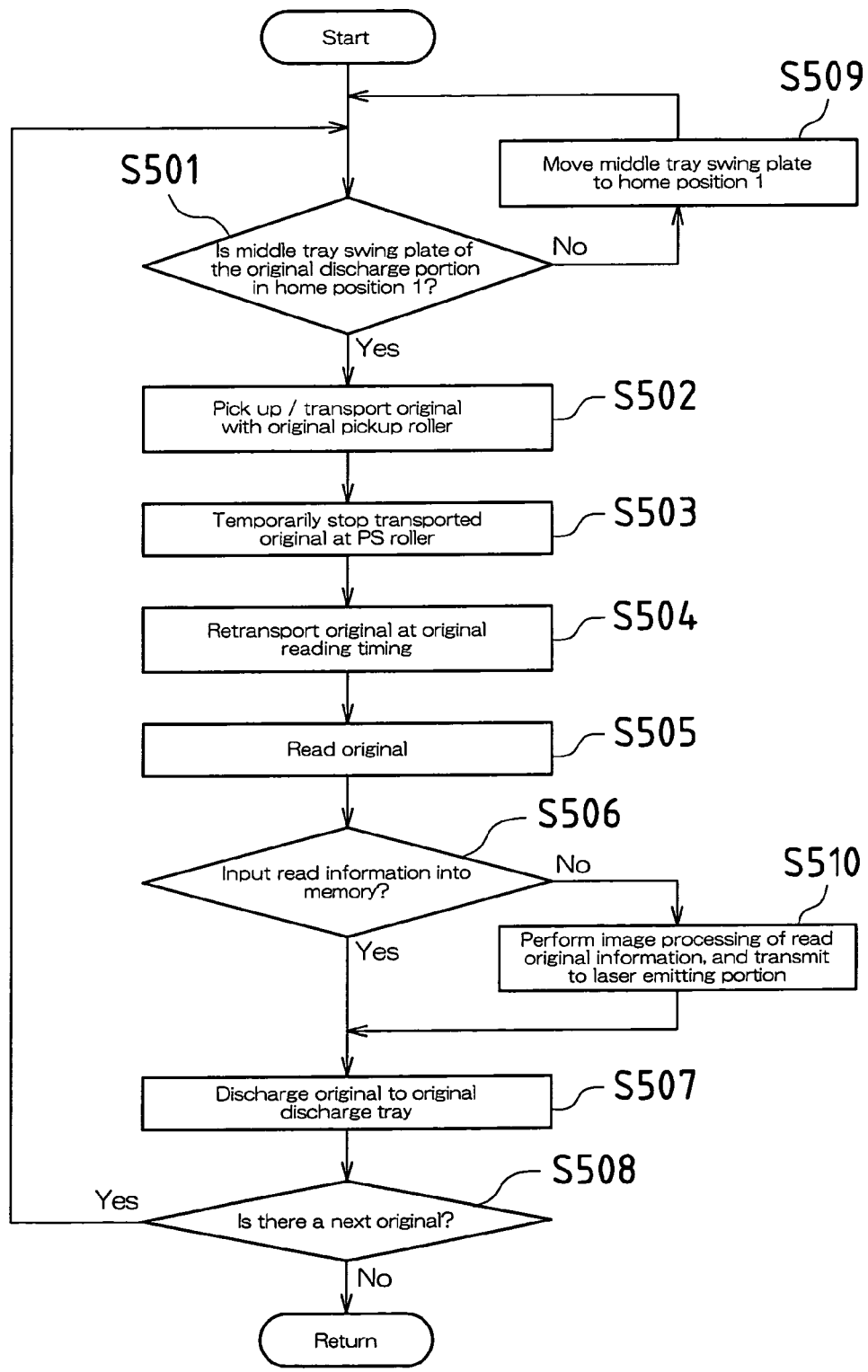
FIG. 7 is a flowchart that shows a reading operation of a simplex original in an original reading apparatus with a U-shaped type top-intake system.
Figure 8:
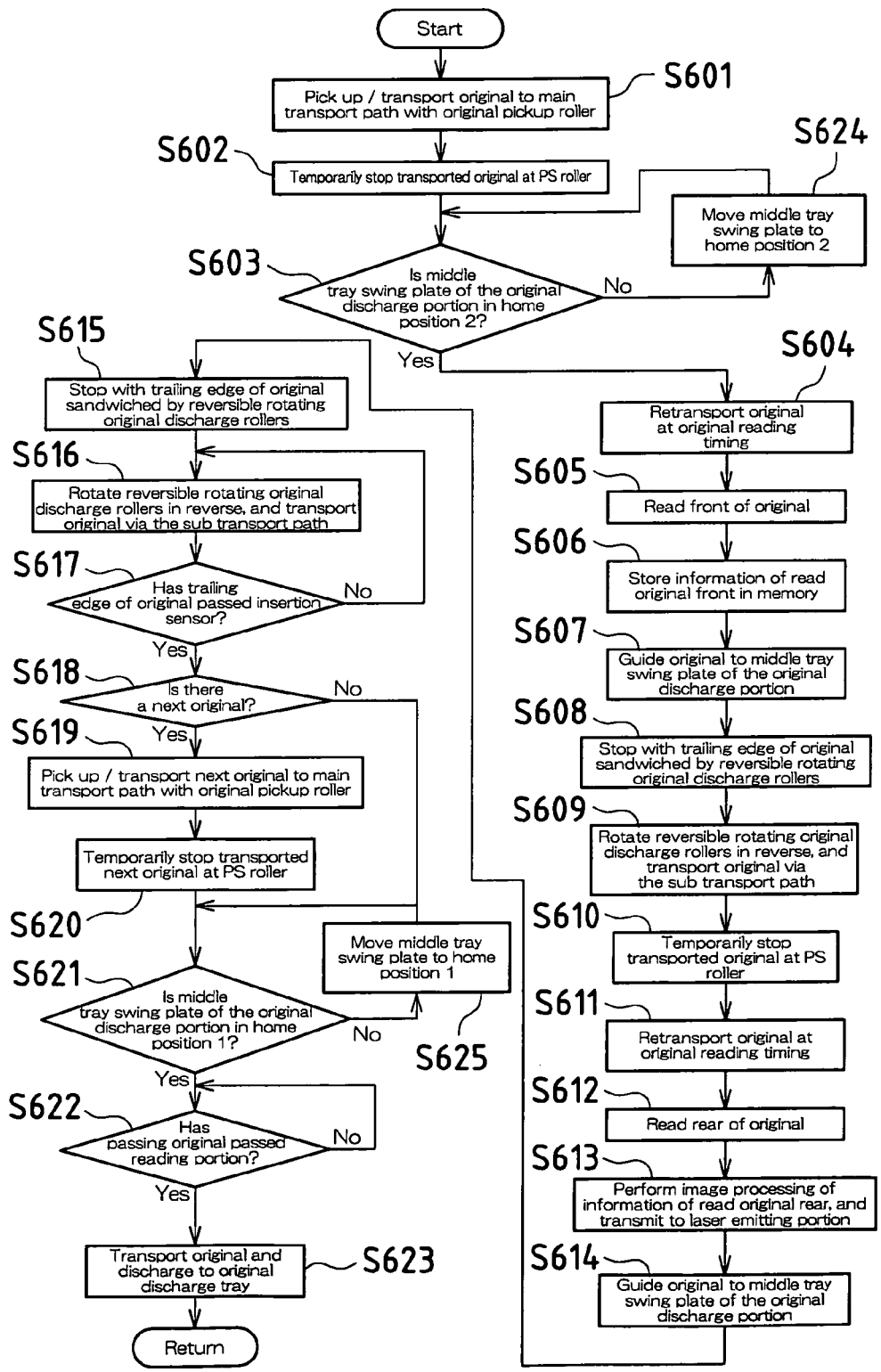
FIG. 8 is a flowchart that shows a reading operation of a duplex original in an original reading apparatus with a U-shaped type top-intake system.

Here, the U-shaped type top intake system original reading apparatus 1 shown in FIG. 2 is described in more detail with reference to FIGS. 6 through FIG. 8. FIG. 6 is a cross-sectional view of the original reading apparatus 1, FIG. 7 is a flowchart that shows the reading operation of a simplex original in this original reading apparatus 1, and FIG. 8 is a flowchart that shows the reading operation of a duplex original in the original reading apparatus 1.

This original reading apparatus 1 can read an original P that has been placed on an original stage 2 in a stationary state, and can read an original P while transporting the original P on another original stage 3. In order to perform this reading, an original reading mechanism 30 provided with a light source unit 6 including a light source 4 and a mirror 5, a mirror unit 9 including mirrors 7 and 8, an imaging lens 10, and a CCD reading unit 11, is provided below the original stages 2 and 3.

When performing stationary reading using the original stage 2, by the light source unit 6 scanning at a velocity V and the mirror unit 9 scanning at a velocity V/2 below this original stage 2, an image of the entire original is read while keeping the light path length to the CCD reading unit 11 constant. Also, when performing moving reading using the original stage 3, the light source unit 6 is stopped below this original stage 3, and an image of the entire original is read by the original P being transported as described later. Also, an original pressing plate 13 provided on the rear side of an original cover 12 is disposed facing the original stage 2, and an original pressing plate 15 biased to the side of the original stage 3 by a bias spring 14 is disposed facing the original stage 3.

A sheet transport mechanism 20 in this original reading apparatus 1, when roughly divided, is configured by including an original housing tray 21 disposed relatively above, an original discharge tray 22 disposed below this original housing tray 21, and a curved transport path 23 that connects the original housing tray 21 and the original discharge tray 22.

A rotatable pickup roller R1 is disposed such that it can make contact with the original P placed on the original housing tray 21. When this pickup roller R1 rotates, movement of the pickup roller R1 is transmitted to the original P due to frictional force between the pickup roller R1 and the original P, and that original P is extracted from the original housing tray 21. Further, the original P is separated page by page by a separator roller R2 and a separator plate 16, and transported to a main transport path 24 forming the curved transport path 23. After transport of the original P is confirmed by the original insertion sensor (paper length detection sensor) 26, the transported original P is transported to an original reading portion of the original stage 3 via a drive roller R3, which is a timing roller (PS roller) that aligns the leading edge of the original P passing obliquely and delivers the original P at a prescribed image reading timing, and an idler roller R4 that forms a pair with this drive roller R3, and reading of an original image is performed.

The original P for which reading is complete is drawn out of the original reading portion by a pair of transport rollers R5 and R6, and discharged via a discharge path 27 onto the original discharge tray 22 by a pair of discharge rollers R7 and R8 that are reversibly rotatable.

In this original reading apparatus, a middle tray 28 is disposed between the original housing tray 21 and the original discharge tray 22, and a swing plate 29 is provided facing discharge rollers R7 and R8. As shown by the solid line in FIG. 6, when the swing plate 29 has sprung upward (home position 1), an original P that has been discharged from the discharge rollers R7 and R8 is discharged onto the original discharge tray 22. On the other hand, as shown by the dashed double-dotted line (imaginary line), when the swing plate 29 is sloped downward (home position 2), an original that has been discharged from the discharge rollers R7 and R8 is picked up by the swing plate 29 and discharged onto the middle tray 28.

The middle tray 28 and the swing plate 29 are provided in order to make it possible to read both the front side and the rear side of the original P, and an original P that has been transported through the discharge path 27 and discharged from the discharge rollers R7 and R8 is discharged onto the middle tray 28 and temporarily stopped in a state with the trailing edge held between the discharge rollers R7 and R8. Afterwards, by reversing the discharge rollers R7 and R8, the original P enters a sub transport path 25, and merges with the curved transport path 23 from this sub transport path 25. In this way, first the image of the front side of an original P that has been placed on the original housing tray 21, and next an image of the rear side of the original P, are read by performing switchback transport via the discharge path 27, the discharge rollers R7 and R8, the swing plate 29, the middle tray 28 and the sub transport path 25.

-Description of the Reading Operation of the Original Reading Apparatus 1-

FIG. 7 is a flowchart that shows the reading operation of a simplex original in the original reading apparatus 1 configured in the manner described above. Following is an explanation of the reading operation of a simplex original with reference to this flowchart.

First, when simplex reading processing is selected, a judgment is performed of whether or not the swing plate 29 of the middle tray 28 of the original discharge portion is in the home position 1 (Step S501). At this time, the home position 1 is the position shown by a solid line in FIG. 6 as described above, which is a position for guiding the original after reading to the original discharge tray 22.

When the result of the judgment in Step S501 is that the swing plate 29 of the middle tray 28 is not in home position 1, the swing plate 29 is moved to home position 1 (Step S509).

After the position of the swing plate 29 has been determined in this manner, the original is transported by the pickup roller R1 for supplying the original (Step S502), temporarily stopped at the drive roller R3 as described above (Step S503), and transported again with the original reading timing (Step S504).

The original that has been transported is read in the original reading portion (Step S505). At this time, a judgment is performed of whether or not the read original will be input into a memory in the control portion (Step S506). This judgment is determined by a page number setting for single printing or multi-printing when the number of pages to print has been set. Multi-printing is indicated when memory input has been performed in Step S506, and single printing is indicated when memory input has not been performed, and after image processing of image information of the read original has been performed in the control portion, image information is immediately sent to a laser emitting portion of the image forming portion. In the case of single printing (when judged 'No' in Step S506), image processing of the read original information is performed, and the information is transmitted to the laser emitting portion (Step S510).

While image processing is being performed in this manner, the original is transported via the transport rollers R5 and R6 to the discharge rollers R7 and R8, which are rotating in the original discharge direction, and is discharged onto the original discharge tray 22 because the swing plate 29 is in home position 1 (Step S507).

Further, a judgment is made of whether or not there is a next original. The operation goes back to Step S501 when there is a next original, or returns when there is not a next original (Step S508).

Reading of a simplex original is performed by this sort of operation of an original transport mechanism and an original reading portion. It goes without saying that an original for which this sort of simplex reading is performed can either be an original which has an original image on only one side of the original, or an original for which the user's reading request specifies only one side even though an original image is on both sides of the original.

FIG. 8 is a flowchart that shows the reading operation of a duplex original in the original reading apparatus 1. Following is an explanation of the reading operation of a duplex original with reference to this flowchart.

First, when duplex reading processing is selected, a duplex original is transported by the pickup roller R1 for supplying the original (Step S601), and temporarily stopped at the drive roller R3 as described above (Step S602). Next, a judgment is performed of whether or not the swing plate 29 of the middle tray 28 of the original discharge portion is in home position 2 (Step S603). At this time, the home position 2 is the position shown by the dashed double-dotted line (imaginary line) in FIG. 6 as described above, which is a position for guiding the original after reading to the middle tray 28.

When the result of the judgment in Step S603 is that the swing plate 29 is not in home position 2, the swing plate 29 is moved to home position 2 (Step S624).

After the position of the swing plate 29 of the middle tray 28 has been determined in this manner, the original is transported again with the original reading timing (Step S604).

Image information of the front side of the transported original is read in the original reading portion (Step S605). At this time, the image information of the front side that has been read is input into the memory in the control portion (Step S606). In this case, the image information of the front side that has been input into the memory is in a state in which image processing has been performed.

While image processing and memory input are being performed in this manner, the original is transported via the transport rollers R5 and R6 to the discharge rollers R7 and R8 rotating in the original discharge direction, and guided to the middle tray 28 because the swing plate 29 is in home position 2 (Step S607). The original, which has been guided to the middle tray 28, is temporarily stopped in a state with the trailing edge in the original transport direction sandwiched by the discharge rollers R7 and R8 (Step S608).

The foregoing is the reading transport process of the front side.

Afterward, due to the discharge rollers R7 and R8 performing rotation opposite to the rotation direction in Step S607, the original is transported via the sub transport path 25 (Step S609). The transported original is temporarily stopped at the drive roller R3 (Step S610), and transported again with the original reading timing (Step S611).

The image information of the rear side of the transported original is read in the original reading portion (Step S612). At this time, the read image information of the rear side is transmitted to the laser emitting portion of the image forming portion after image processing has been performed in the control portion (Step S613)

While image processing and transmission are being performed in this manner, the original is transported via the transport rollers R5 and R6 to the discharge rollers R7 and R8 again rotating in the original discharge direction, and guided to the middle tray 28 because the swing plate 29 is in home position 2 (Step S614). The original, which has been guided to the middle tray 28, is temporarily stopped in a state with the trailing edge in the original transport direction sandwiched by the discharge rollers R7 and R8 (Step S615).

The foregoing is the reading transport process of the rear side.

Afterward, by the discharge rollers R7 and R8 performing rotation opposite to the rotation direction in Step S614, the temporarily stopped original is transported via the sub transport path 25 (Step S616). The original insertion sensor 26 judges whether or not the trailing edge of the passing original transported in this manner has passed this original insertion sensor 26 (Step S617). At this time, when the trailing edge of the original has passed and there is also a next original (when judged 'Yes' in Step S618), the next original is transported by the pickup roller R1 for supplying the original (Step S619), and waits in a state temporarily stopped at the drive roller R3 (Step S620) until the reading timing arrives. In this manner, an original whose front and rear sides have been read is transported through the transport path even when a next original is in the midst of being transported.

When the original transported in this manner passes the original insertion sensor 26, a judgment is performed of whether or not the swing plate 29 is in home position 1 (Step S621). At this time, because the swing plate 29 is in a state disposed at home position 2 in Step S603, the swing plate 29 is moved to home position 1 (Step S625).

The position of the swing plate 29 is determined in this manner. Even while doing so, the original is transported to the discharge rollers R7 and R8 via the transport rollers R5 and R6, and discharged onto the original discharge tray 22 due to original discharge rotation and the position of the swing plate 29 (Step S623). A configuration may also be adopted in which, when it has been judged that the original has passed the original reading portion in a judgment of whether or not the original has passed the original reading portion (Step S622), reading of a next original is started if there is a next original.

The foregoing is the idle transport process of an original.

Reading of a duplex original is performed by the above manner of original transport operation and operation of the original reading portion.

In this way, there are three transport processes for reading of a duplex original—"front side original reading transport", "rear side original reading transport", and "original idle transport". The reason for performing this sort of transport is that the "front side original reading transport" and "rear side original reading transport" are naturally necessary, but when discharging the original to the original discharge tray 22 by moving the position of the swing plate 29 after completing the "rear side original reading transport" process, the order of the front and rear of the originals does not match when a plurality of pages of originals have been processed, and it becomes impossible to arrange pages in order. In order to eliminate this sort of problem, the "original idle transport" process is necessary.

The original reading operation by the original reading apparatus 101 with a U-shaped type bottom-intake system shown in FIG. 3 is the same as for the original reading apparatus 1 with a U-shaped type top-intake system described above. Also with respect to the original reading apparatus 201 with a straight type top-intake system shown in FIG. 4 and the original reading apparatus 301 with a straight type bottom-intake system shown in FIG. 5, although the transport path of originals is different, the original reading operation (particularly, the simplex reading processing) is basically the same as for the original reading apparatus 1 with a U-shaped type top-intake system described above.

As shown in FIGS. 2 and 3, in the original reading apparatuses 1 and 101, which are provided with a transport path in which the original P is transported in a U shape, by placing the original P facing upward, it is possible for the original face of the supplied original P to face the original reading portion (specifically, the light source unit 6 of the original stage 3), and reading of the original P can be performed.

As shown in FIGS. 4 and 5, in the original reading apparatuses 201 and 301, provided with a transport path in which the original P is transported straight from right to left, by placing the original P facing downward, it is possible for the original face of the supplied original P to face the original reading portion (specifically, the light source unit 6 of the original stage 3), and reading of the original P can be performed.

-Description of Each Original Reading Apparatus and State of Original When Multi-feeding Occurs- <U-Shaped Type>

Figure 9:
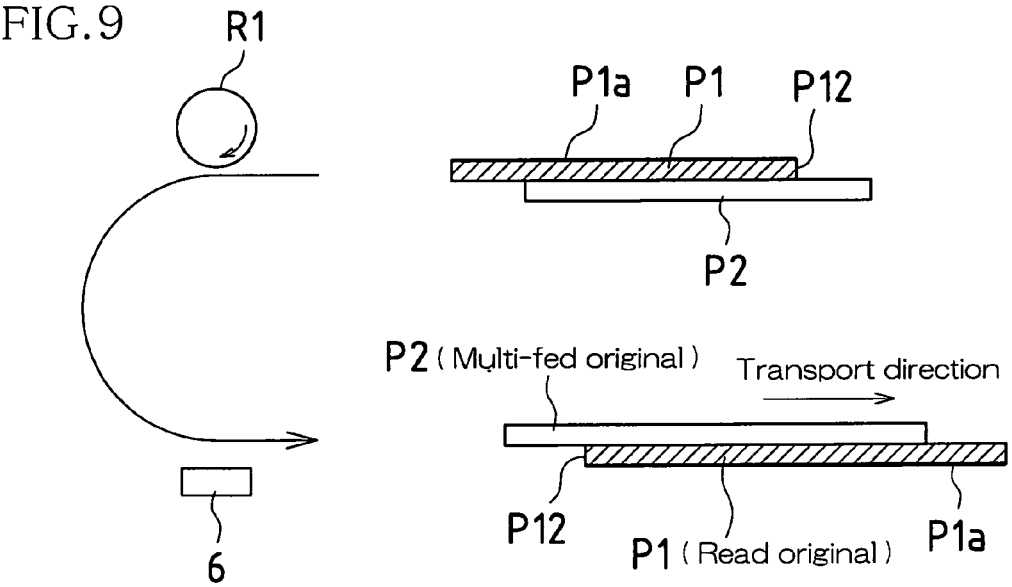
FIG. 9 is a schematic view that shows the overall structure of a transport path of the original reading apparatus in which an original is transported in a U-shape shown in FIG. 2 and a state in which an original has been multi-fed.
Figure 10:
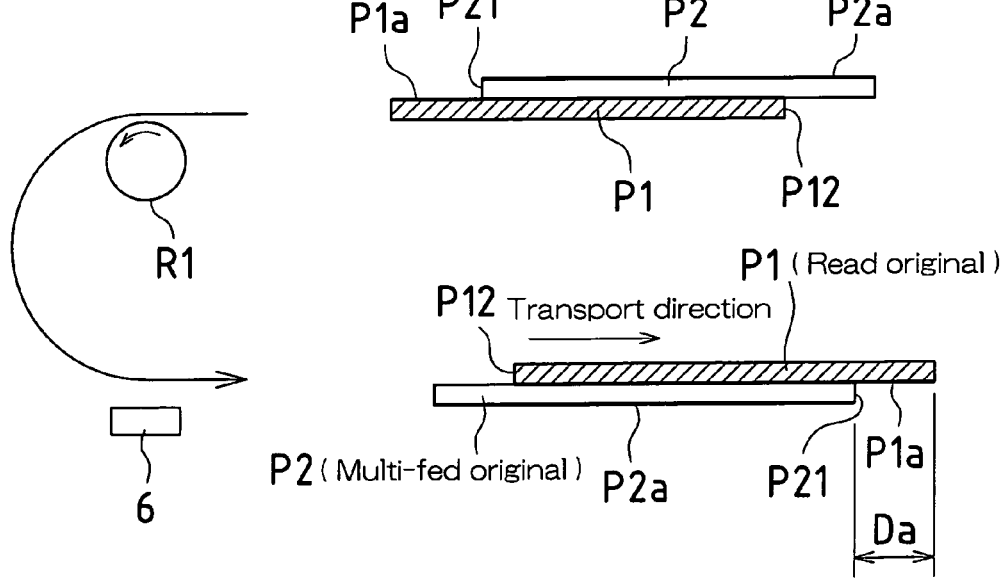
FIG. 10 is a schematic view that shows the overall structure of a transport path of the original reading apparatus in which an original is transported in a U-shape shown in FIG. 3 and a state in which an original has been multi-fed.

FIGS. 9 and 10 are schematic views that show the overall structure of the transport paths of the original reading apparatuses 1 and 101 shown in FIGS. 2 and 3 above, and in which the original is transported in a U-shape and a state in which an original has been multi-fed. In the case of reverse supply provided with a U-shaped transport path, the upper face of the original placed on the original housing tray 21 becomes the read face (original face).

FIG. 9 shows a case in which the original on the original housing tray 21 is taken from the top. In the case that multi-feeding occurs when taking from the top, when an original P1 that should be read this time (hereinafter, "read original P1") and another original P2 that has been multi-fed (hereinafter, "multi-fed original P2") pass the original reading portion (light source unit 6), the multi-fed original P2 becomes stacked together on the read original P1. At this time, the multi-fed original P2 does not become an obstacle between a read face (original face) P1a of the read original P1 and the original reading portion (light source unit 6). Accordingly, it is understood that even if the reading operation is continued in that state, there is not an effect on the reading operation of the read original P1.

On the other hand, FIG. 10 shows a case in which the original on the original housing tray 21 is taken from the bottom. In the case that multi-feeding occurs when taking from the bottom, when the read original P1 and the multi-fed original P2 pass the original reading portion (light source unit 6), the read face (original face) P1a of the read original P1 becomes stacked together on the multi-fed original P2. At this time, the multi-fed original P2 becomes an obstacle between the read face (original face) P1a of the read original P1 and the original reading portion (light source unit 6). Accordingly, even if the reading operation is continued in that state, it is not possible to read the read face (original face) P1a of the read original P1. However, it is understood that regarding the multi-fed original P2, there is no obstacle between a read face (original face) P2a of the multi-fed original P2 and the original reading portion (light source unit 6), and so the reading operation of the multi-fed original P2 is possible.

<Straight Type>

Figure 11:
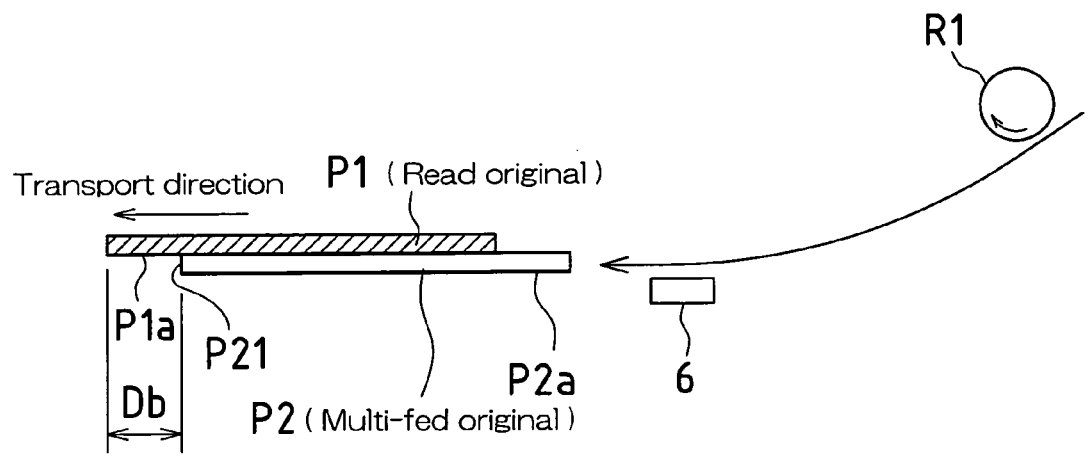
FIG. 11 is a schematic view that shows the overall structure of a transport path of the original reading apparatus in which an original is transported straightly shown in FIG. 4 and a state in which an original has been multi-fed.
Figure 12:
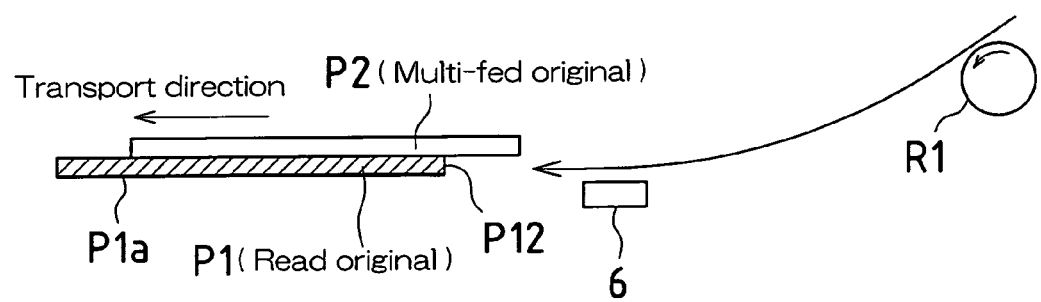
FIG. 12 is a schematic view that shows the overall structure of a transport path of the original reading apparatus in which an original is transported straightly shown in FIG. 5 and a state in which an original has been multi-fed.

FIGS. 11 and 12 are schematic views that show the overall structure of the transport paths of the original reading apparatuses 201 and 301 shown in FIGS. 4 and 5 above, in which the original is transported straight, and a state in which an original has been multi-fed. In the case of an original reading apparatus provided with a straight type transport path, the bottom face of the original placed on the original housing tray 21 becomes the read face (original face).

FIG. 11 shows a case in which the original on the original housing tray 21 is taken from the top. In the case that multi-feeding occurs when taking from the top, when the read original P1 and the multi-fed original P2 pass the original reading portion (light source unit 6), the read face (original face) P1a of the read original P1 becomes stacked together on the multi-fed original P2. At this time, the multi-fed original P2 becomes an obstacle between the read face (original face) P1a of the read original P1 and the original reading portion (light source unit 6). Accordingly, even if the reading operation is continued in that state, it is not possible to read the read face (original face) P1a of the read original P1. However, it is understood that regarding the multi-fed original P2, there is no obstacle between the read face (original face) P2a of the multi-fed original P2 and the original reading portion (light source unit 6), and so the reading operation of the multi-fed original P2 is possible.

On the other hand, FIG. 12 shows a case in which the original on the original housing tray 21 is taken from the bottom. In the case that multi-feeding occurs when taking from the bottom, the multi-fed original P2 becomes stacked together on the read original P1. At this time, the multi-fed original P2 does not become an obstacle between the read face (original face) P1a of the read original P1 and the original reading portion (light source unit 6). Accordingly, it is understood that even if the reading operation is continued in that state, there is not an effect on the reading operation of the read original P1.

Following is a description of various examples of the original reading operation performed by each image reading apparatus when multi-feeding has occurred, based on the state of the original when multi-feeding occurs according to each original reading apparatus described above.

(Description of the Original Reading Operation when Multi-feeding Occurs)

EXAMPLE 1

Example 1 is an example of the original reading operation when multi-feeding occurs according to the original reading apparatus 1 with a U-shaped type top-intake system shown in FIGS. 2 and 9.

That is, in the top-intake system original reading apparatus 1 provided with a U-shaped type transport path, even if multi-feeding is detected, as shown in FIG. 9, the multi-fed original P2 is not positioned between the read original P1 and the original reading portion (light source unit 6) of the original stage 3, and so in this case the operation of reading an image of the read original P1 continues as usual. In this case, an image of the multi-fed original P2 cannot be read, and will be processed as a reading defect.

Following is a description of multi-feeding detection.

In the present embodiment, a new detection portion for detecting multi-feeding is not provided; the original reading portion (such as the light source unit 6) is also used as a multi-feeding detection portion. In this case, when reading an original (during reading), multi-feeding is detected by detecting a shadow or the like of the edge of the multi-fed portion of an original. The inventors, as a result of testing, have confirmed that it is possible to reliably detect multi-feeding of an original even when the original reading portion is used also as the multi-feeding detection portion.

In Example 1, as shown in FIG. 9, multi-feeding is detected by detecting a trailing edge P12 of the read original P1.

Figure 13:
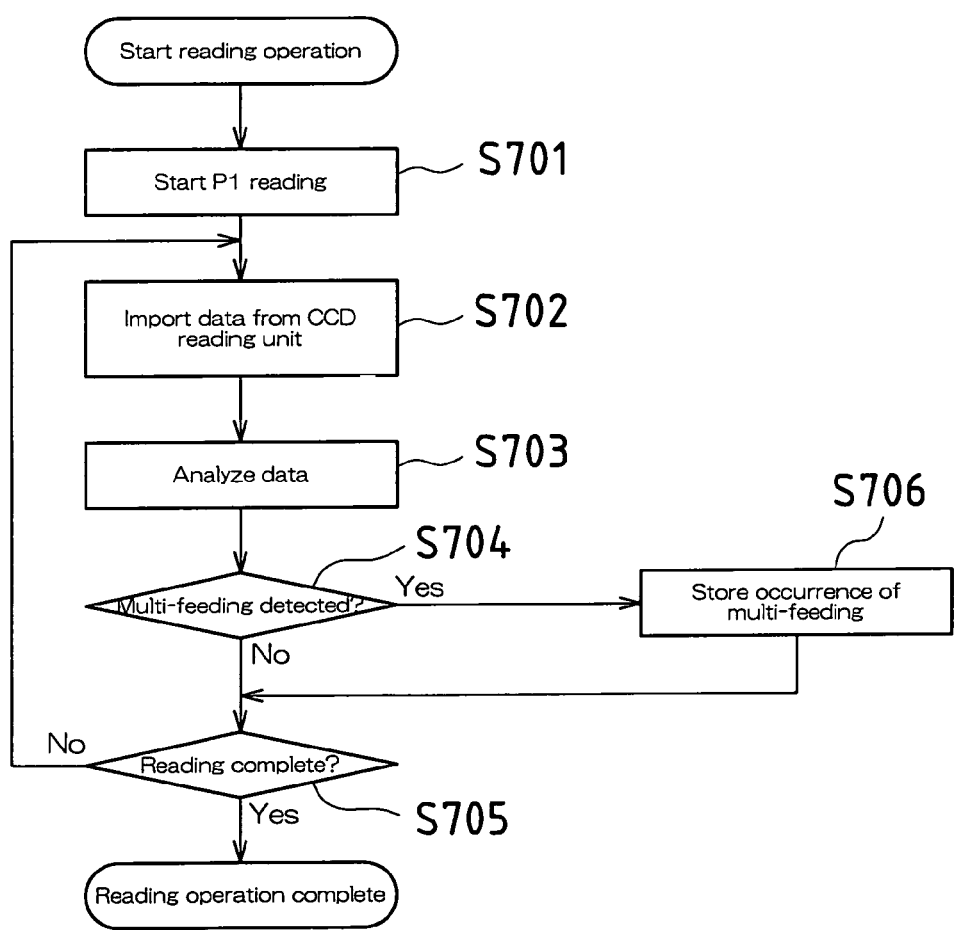
FIG. 13 is an overall flowchart of an original reading operation when multi-feeding occurs in Example 1.

FIG. 13 is an overall flowchart of the original reading operation when multi-feeding occurs in Example 1.

As shown in FIG. 13, first, processing is performed in order to start reading of the read original P1 (Step S701). Next, data is imported from a CCD reading unit 11 (Step S702). The imported data is analyzed (Step S702), and when multi-feeding is detected by detecting a shadow or the like of the edge of an original (S704), the operation advances to Step S706, and when multi-feeding is not detected, the operation advances to Step S705.

When multi-feeding has been detected, the occurrence of multi-feeding is stored (Step S706), and the operation advances to Step S705 in order to continue the reading operation of the read original P1.

Then a judgment is performed of whether or not reading of the read original P1 has completed (Step S705), and when that reading has not completed, the operation goes back to Step S702 and repeats.

EXAMPLE 2

Example 2 is an example of the original reading operation when multi-feeding occurs according to the original reading apparatus 101 with a U-shaped type bottom-intake system shown in FIGS. 3 and 10.

That is, in the bottom-intake system original reading apparatus 101 provided with a U-shaped type transport path, when multi-feeding has been detected, as shown in FIG. 10, when the multi-fed original P2 and the read original P1 pass the original reading portion (light source unit 6), the read face (original face) P1a of the read original P1 is stacked together on the multi-fed original P2, and the multi-fed original P2 becomes an obstacle between the read face (original face) P1a of the read original P1 and the original reading portion (light source unit 6). Accordingly, in this case the reading operation of the read original P1 is stopped. In this Example 2, multi-feeding is detected by detecting a leading edge portion P21 of the read original P2.

Figure 14:
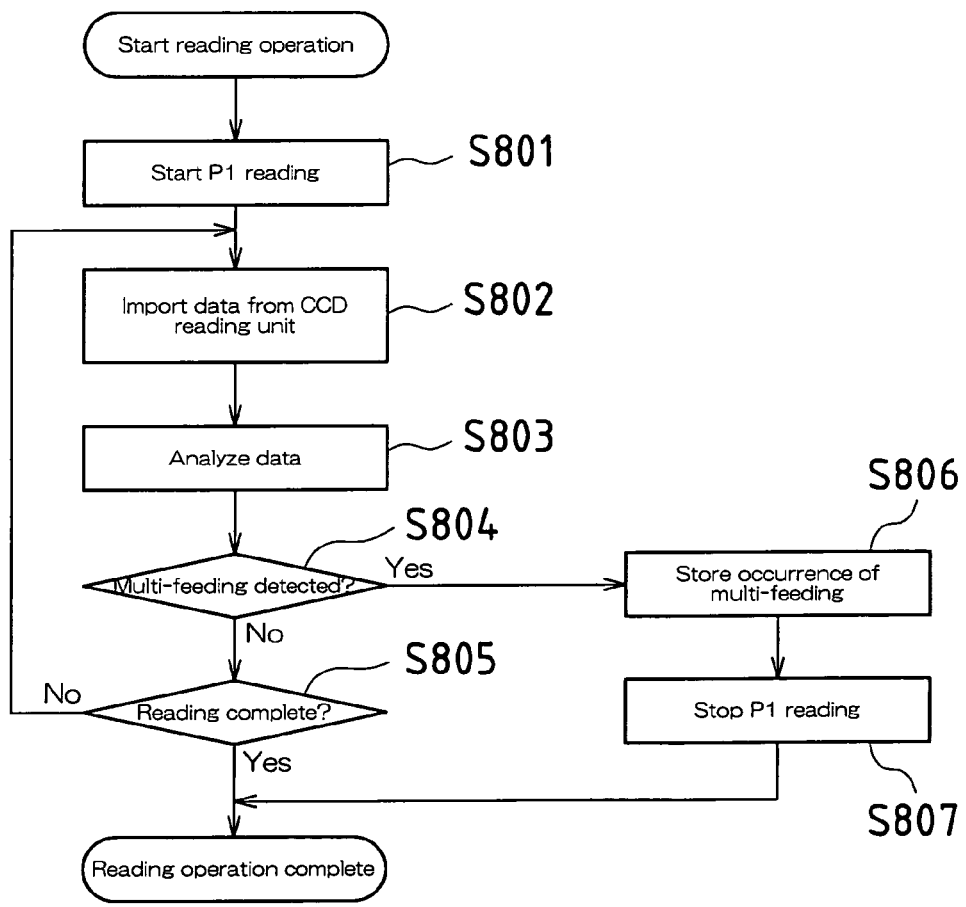
FIG. 14 is an overall flowchart of an original reading operation when multi-feeding occurs in Example 2.

FIG. 14 is an overall flowchart of the original reading operation when multi-feeding occurs in Example 2.

As shown in FIG. 14, first, processing is performed in order to start reading of the read original P1 (Step S801). Next, data is imported from the CCD reading unit 11 (Step S802). The imported data is analyzed (Step S802), and when multi-feeding is detected by detecting a shadow or the like of the edge of an original (S804), the operation advances to Step S806, and when multi-feeding is not detected, the operation advances to Step S805.

When multi-feeding has not been detected, a judgment is performed of whether or not reading of the read original P1 has completed (Step S805), and if that reading has not completed, then the operation goes back to Step S802 and processing is repeated.

When multi-feeding has been detected, the occurrence of multi-feeding is stored (Step S806), reading of the read original P1 is stopped, and the reading operation is ended.

EXAMPLE 3

Example 3 is another example of the original reading operation when multi-feeding occurs according to the original reading apparatus 101 with a U-shaped type bottom-intake system shown in FIGS. 3 and 10.

That is, in Example 2 described above, the reading operation of the read original P1 is stopped when multi-feeding has been detected, but as shown in FIG. 10, regarding the multi-fed original P2, there is no obstacle between the read face (original face) P2a of the multi-fed original P2 and the original reading portion (light source unit 6), and therefore the reading operation for the multi-fed original P2 is possible. Accordingly, in this Example 3, the reading of the read original P1 that should be read is skipped, and the reading operation of the multi-fed original P2 is executed instead.

In this case, as shown in FIG. 10, it is necessary to postpone the reading start timing by the amount of a displacement Da of the stacking of the read original P1 and the multi-fed original P2, but because multi-feeding detection is performed by detecting the leading edge portion P21 of the multi-fed original P2, it is possible to read an image of the multi-fed original P2 based on that detection timing. When the original reading of the read original P1 has already started by the time multi-feeding is detected, the reading operation is temporarily stopped at the point in time that multi-feeding was detected, the image read up until that point in time is deleted, and reading of the multi-fed original P2 starts in succession.

Figure 15:
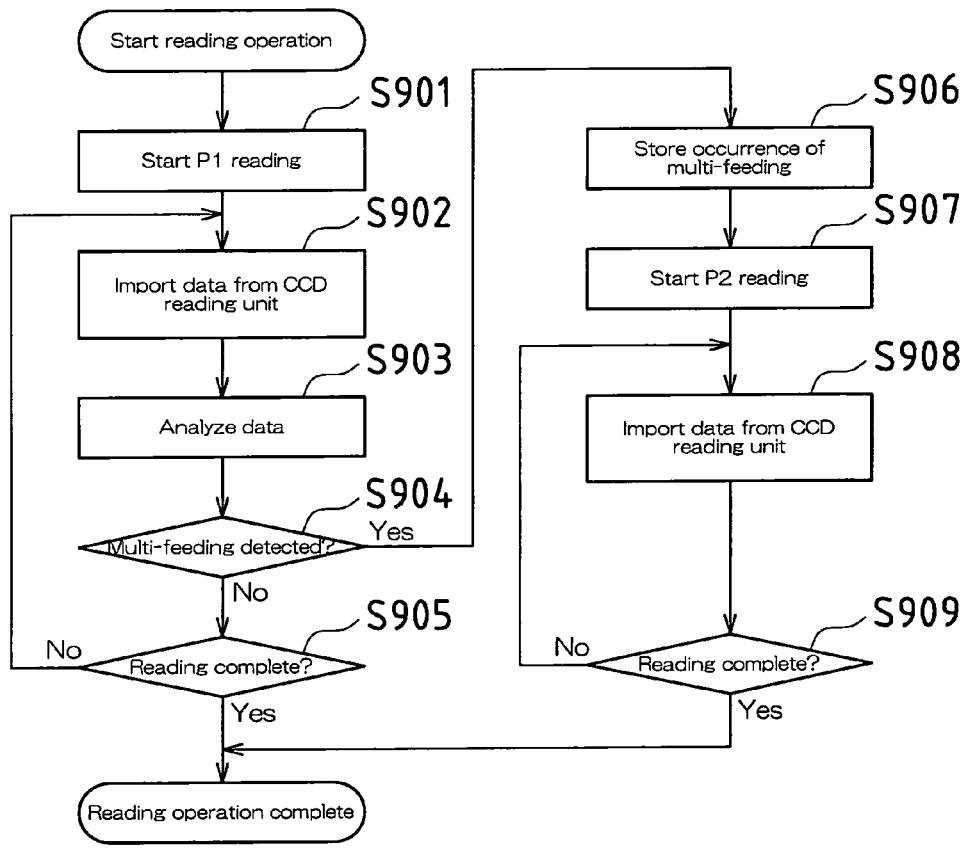
FIG. 15 an overall flowchart of an original reading operation when multi-feeding occurs in Example 3.

FIG. 15 is an overall flowchart of the original reading operation when multi-feeding occurs in Example 3.

As shown in FIG. 15, first, processing is performed in order to start reading of the read original P1 (Step S901). Next, data is imported from the CCD reading unit 11 (Step S902). The imported data is analyzed (Step S902), and when multi-feeding is detected by detecting a shadow or the like of the edge of an original (S904), the operation advances to Step S906, and when multi-feeding is not detected, the operation advances to Step S905.

When multi-feeding has not been detected, a judgment is performed of whether or not reading of the read original P1 has completed (Step S905), and if that reading has not completed then the operation goes back to Step S902 and processing is repeated.

When multi-feeding has been detected, the occurrence of multi-feeding is stored (Step S906), reading of the read original P1 is stopped, and processing is newly performed in order to start reading of the multi-fed original P2 (Step S907). At this time, image data that has been imported up until then is also deleted.

Then, data is imported from the CCD reading unit 11 (Step S908), a judgment is performed of whether or not reading of the multi-fed original P2 has completed (Step S909), and if that reading has not completed then the operation goes back to Step S908 and processing is repeated.

EXAMPLE 4

Example 4 is an example of the original reading operation when multi-feeding occurs according to the original reading apparatus 201 with a straight type top-intake system shown in FIGS. 4 and 11.

That is, in the top-intake system original reading apparatus 201 provided with a straight type transport path, when multi-feeding has been detected, as shown in FIG. 11, when the multi-fed original P2 and the read original P1 pass the original reading portion (light source unit 6), the read face (original face) P1a of the read original P1 is stacked together on the multi-fed original P2, and the multi-fed original P2 becomes an obstacle between the read face (original face) P1a of the read original P1 and the original reading portion (light source unit 6). Accordingly, in this case the reading operation of the read original P1 is stopped. In Example 4, multi-feeding is detected by detecting the leading edge portion P21 of the multi-fed original P2.

The overall flowchart of the original reading operation when multi-feeding occurs in Example 4 is the same as FIG. 14.

EXAMPLE 5

Example 5 is another example of the original reading operation when multi-feeding occurs according to the original reading apparatus 201 with a straight type top-intake system shown in FIGS. 4 and 11.

That is, in Example 4 described above, the reading operation of the read original P1 is stopped when multi-feeding has been detected, but as shown in FIG. 11, regarding the multi-fed original P2, there is no obstacle between the read face (original face) P2a of the multi-fed original P2 and the original reading portion (light source unit 6), and therefore the reading operation for the multi-fed original P2 is possible. Accordingly, in Example 5, the reading of the read original P1 that should be read is skipped, and the reading operation of the multi-fed original P2 is executed instead.

In this case, as shown in FIG. 11, it is necessary to postpone the reading start timing by the amount of a displacement Db of the stacking of the read original P1 and the multi-fed original P2, but because multi-feeding detection is performed by detecting the leading edge portion P21 of the multi-fed original P2, it is possible to read an image of the multi-fed original P2 based on that detection timing. When the original reading of the read original P1 has already started by the time multi-feeding is detected, the reading operation is temporarily stopped at the point in time that multi-feeding was detected, the image read up until that point in time is deleted, and reading of the multi-fed original P2 starts in succession.

The overall flowchart of the original reading operation when multi-feeding occurs in Example 5 is the same as FIG. 15.

EXAMPLE 6

This Example 6 is an example of the original reading operation when multi-feeding occurs according to the original reading apparatus 301 with a straight type bottom-intake system shown in FIGS. 5 and 12.

That is, in the bottom-intake system original reading apparatus 301 provided with a straight type transport path, even if multi-feeding is detected, the multi-fed original P2 is not positioned between the read original P1 and the original reading portion (light source unit 6) of the original stage 3, and so in this case the operation of reading an image of the read original P1 continues as usual. In this case, an image of the multi-fed original P2 cannot be read, and will be processed as a reading defect. In this Example 6, as shown in FIG. 12, multi-feeding is detected by detecting the trailing edge P12 of the read original P1.

The overall flowchart of the original reading operation when multi-feeding occurs in this Example 6 is the same as FIG. 13.

MODIFIED EXAMPLES OF EXAMPLES 1 to 6

A configuration may also be adopted in which, when multi-feeding has been detected in the manner described in the above examples, an operator is notified that multi-feeding has occurred. A configuration may also be adopted in which, as a method of notification, an error message or the like that multi-feeding has occurred is displayed on a display panel portion 33 provided in an operating input portion 32 of the original reading apparatus shown in FIG. 1. It is also possible to notify the operator by emitting a buzzer sound from a built-in buzzer or the like not shown in the figures, or emitting an electronic sound. It is more effective if notification is made with both the display of an error message and a notification sound. Further, a configuration may be adopted in which the contents displayed on the display panel portion 33 are not limited to an error message; information of an original for which reading has not been performed due to multi-feeding is displayed. For example, a page of an original for which reading has not been performed due to multi-feeding is displayed. Thus, because the operator can clearly understand which page must be reread, the effectiveness of recapture processing improves.

Also, by equipping a scanner apparatus, copy apparatus, or facsimile apparatus, or a multifunction machine in which any of these apparatuses are combined, with the original reading apparatus of these illustrative examples, it is possible to provide an electronic equipment in which an improvement in reading efficiency of originals has been achieved.

The present invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes that come within the meaning and range of equivalency of the claims are intended to be embraced therein.

This application claims priority on Patent Application No. 2003-185360 filed in Japan on Jun. 27, 2003, the entire contents of which are hereby incorporated by reference. Patents and publications cited herein are hereby specifically incorporated by reference in their entirety.

INDUSTRIAL APPLICABILITY

In the above manner, the image processing apparatus, original reading apparatus, electronic equipment, and original reading method of the present invention are very suitable for, for example, a scanner apparatus, copy apparatus, or facsimile apparatus, or a multifunction machine in which two or more of these are combined.

The invention claimed is:

1. An original reading apparatus comprising:
   an original transport mechanism, said mechanism having a movable member that transports an original document placed on a document placement stage, and
   an original reading mechanism having a light source that illuminates the transported original document, an optical sensor, and an optical system that guides light reflected from the illuminated original document to the optical sensor, and that captures an image of the transported original document, wherein
   the moveable member transports a first original document by making contact with said first original document and delivers it to the reading mechanism by transmitting its movement to the first original document via frictional force in a manner such that upon detection, by the optical sensor, of a leading edge of another original document while the first original document is illuminated,
   the original reading mechanism stops the reading operation of the first original document and deletes the read image, and the reading operation of the image of the other original document by the original reading mechanism proceeds based on the other original document being positioned between the first original document and a reading portion of the original reading mechanism.

2. The original reading apparatus according to claim 1, wherein the original transport mechanism includes a structure having a plurality of document pages placed on the document placement stage face upward such that the moveable member supplies and transports the document pages page by page beginning with the bottom page, or includes a structure having a plurality of document pages placed on the document placement stage face downward such that the moveable member supplies and transports the document pages page by page beginning with the top page.

3. The original reading apparatus according to claim 1, the apparatus further including a notifier operably connected to the reading mechanism such that when the reading operation of the first original document could not be performed due to multi-feeding, the notifier generates a notification indicating read operation failure due to multi-feeding.

4. The original reading apparatus according to claim 3, wherein the notifier makes a notification of information of the original document for which reading could not be performed due to multi-feeding.

5. An original reading method comprising:
   transporting a first original document with an original transport mechanism,
   reading an image of the transported original document with an original reading mechanism,
   detecting, during said transporting, a leading edge of another original document while the first original document is illuminated, where detecting includes determining relative positions of said first and other original documents by detecting with the reading mechanism whether or not a leading edge of the other document obscures at least part of the first document, and
   stopping the reading operation of the first original document, deleting the read image, and altering said reading operation to read an image of the other original document based on the other original document being positioned between the first original document and the reading portion of the original reading mechanism.

* * * * *

UNITED STATES PATENT AND TRADEMARK OFFICE
CERTIFICATE OF CORRECTION

| | | |
|---|---|---|
| PATENT NO. | : 8,002,277 B2 | |
| APPLICATION NO. | : 10/561543 | |
| DATED | : August 23, 2011 | |
| INVENTOR(S) | : Katsuhiko Kyuken et al. | |

It is certified that error appears in the above-identified patent and that said Letters Patent is hereby corrected as shown below:

On the Title Page, at Section (54), and at Column 1, lines 1-4, correct the title to read:

--IMAGE PROCESSING APPARATUS, ORIGINAL READING APPARATUS, ELECTRONIC EQUIPMENT, AND ORIGINAL READING METHOD--.

Signed and Sealed this
Fifteenth Day of November, 2011

David J. Kappos
*Director of the United States Patent and Trademark Office*